United States Patent
Hogger

(10) Patent No.: US 11,840,026 B2
(45) Date of Patent: Dec. 12, 2023

(54) FIBER COMPONENT HAVING FIBER RODS CONNECTED TO FORM A FRAMEWORK

(71) Applicant: Bayerische Motoren Werke Aktiengesellschaft, Munich (DE)

(72) Inventor: Thomas Hogger, Otterfing (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 878 days.

(21) Appl. No.: 16/435,691

(22) Filed: Jun. 10, 2019

(65) Prior Publication Data

US 2019/0291360 A1 Sep. 26, 2019

Related U.S. Application Data

(63) Continuation of application No. PCT/EP2018/052845, filed on Feb. 6, 2018.

(30) Foreign Application Priority Data

Mar. 2, 2017 (DE) ..................... 10 2017 203 404.1

(51) Int. Cl.
*B29C 70/20* (2006.01)
*B33Y 80/00* (2015.01)
(Continued)

(52) U.S. Cl.
CPC ............ *B29C 70/205* (2013.01); *B29C 33/52* (2013.01); *B29C 70/86* (2013.01); *B33Y 80/00* (2014.12)

(58) Field of Classification Search
CPC ............... B62D 23/005; B29L 2012/20; B29L 2031/7172; B29L 2021/20; B29C 65/70; B29C 70/682; B29C 70/84; B29C 33/52; B29C 66/721; B29C 66/72141; B29C 66/72143; B29C 66/7392; B29C 66/7394; B29C 66/5265; B29C 66/295; B29C 66/86; B29C 70/205; B29C 70/86; B29K 2277/00; B29K 2075/00; B29K 2077/10;
(Continued)

(56) References Cited

U.S. PATENT DOCUMENTS 6,299,246 B1    10/2001    Tomka

FOREIGN PATENT DOCUMENTS

DE    10 2013 219 820 A1    4/2015
EP         0 009 403 A1    4/1980
(Continued)

OTHER PUBLICATIONS

English Translation of Chinese-language Office Action issued in Chinese Application No. 201880005126.4 dated Sep. 1, 2020 (10 pages).

(Continued)

*Primary Examiner* — Camie S Thompson
(74) *Attorney, Agent, or Firm* — Crowell & Moring LLP

(57) ABSTRACT

A fiber component has at least three fiber rods which each have fibers extending continuously in the axial direction of the fiber rods, wherein at least two of the three fiber rods each form a support rod and at least one of the three fiber rods forms a connecting rod. The support rods are arranged substantially parallel in the axial direction thereof and spaced from each other. The connecting rod connects the support rods to each other. The connecting rod forms a node point with the support rod in question at each of the connecting points between the connecting rod and the support rods.

2 Claims, 2 Drawing Sheets

(51) Int. Cl.
   *B29C 33/52* (2006.01)
   *B29C 70/86* (2006.01)
(58) Field of Classification Search
   CPC .......... B29K 2069/00; B29K 2067/003; B29K 2067/006; B29K 2067/06; B29K 2063/00; B29K 2023/06; B29K 2023/10; B29K 2023/12; B29K 2307/04; B29K 2309/08; B33Y 80/00; E04B 1/19; B28B 7/22
   USPC .............. 428/373; 296/205, 901.1; 265/250; 52/741.1; 264/250
   See application file for complete search history.

(56) References Cited

FOREIGN PATENT DOCUMENTS

| GB | 1 305 198 A | 1/1973 |
|---|---|---|
| WO | WO 2010/019948 A2 | 2/2010 |
| WO | WO 2011/143666 A2 | 11/2011 |
| WO | WO 2013/102221 A1 | 7/2013 |

OTHER PUBLICATIONS

"Polymer Matrix Composites: Materials Usage, Design and Analysis", Composite Materials Handbook, American CMH-17 Coordination Committee, Jan. 31, 2015, pp. 242-245, vol. 3, 1$^{st}$ Edition, Shanghai Jiao Tong University Press, (6 pages).

Chinese-language Office Action issued in Chinese Application No. 201880005126.4 dated Mar. 23, 2021 with English translation (18 pages).

International Search Report (PCT/ISA/210) issued in PCT Application No. PCT/EP2018/052845 dated Apr. 20, 2018 with English translation (seven (7) pages).

German-language Written Opinion (PCT/ISA/237) issued in PCT Application No. PCT/EP2018/052845 dated Apr. 20, 2018 (six (6) pages).

German-language Search Report issued in counterpart German Application No. 10 2017 203 404.1 dated Jun. 29, 2017 with partial English translation (11 pages).

FIBER COMPONENT HAVING FIBER RODS CONNECTED TO FORM A FRAMEWORK

CROSS REFERENCE TO RELATED APPLICATIONS

This application is a continuation of PCT International Application No. PCT/EP2018/052845, filed Feb. 6, 2018, which claims priority under 35 U.S.C. § 119 from German Patent Application No. 10 2017 203 404.1, filed Mar. 2, 2017, the entire disclosures of which are herein expressly incorporated by reference.

BACKGROUND AND SUMMARY OF THE INVENTION

The invention relates to a fiber component which consists of fiber rods connected to form a framework.

Fiber rods are used in the art in fiber composite components and differ from fiber layers in that they are formed by a plurality of continuous fibers, that is to say are brought into a predetermined rod shape by means of the fibers. Here, round, quadrangular or hexagonal rods with a height-width ratio of greater than or equal to $1/10$ are usually used as the rod cross-sectional shape. Smaller height-width ratios do not constitute a shaped fiber rod.

Fiber-reinforced plastics have a high lightweight construction potential and can take up high tensile forces by means of the incorporated fibers in comparison to other materials, such as, for example, metals or nonreinforced plastics. Here, the weight-specific advantages of fiber-reinforced plastics can be optimally used if the fibers in the matrix material are configured appropriate to load paths, this requiring a construction of the material that is appropriate to loading. Therefore, it is desirable to be able to use fiber rods not only in a load direction but also to be able to realize changes of direction of fiber rods within a lattice structure in order to ensure a multiaxially loaded component.

The object on which the invention is based is therefore to provide a fiber component which can be produced favorably and in an energy-efficient manner, is very lightweight and can take up load paths in different directions. In addition, it is an object of the invention to provide a method for the favorable and energy-efficient production of such a fiber component.

According to the invention, a fiber component comprising at least three fiber rods is provided. The at least three fiber rods each comprise fibers extending continuously in the axial direction of the fiber rods. At least two of the three fiber rods each form a support rod, and at least one of the three fiber rods each forms a connecting rod. The support rods are arranged substantially parallel to and spaced apart from one another in their axial direction. The connecting rod connects the support rods to one another and respectively forms a node point with the respective support rod at the respective connecting point between the connecting rod and the support rods. The fiber component can also be understood here as a fiber composite component, with the fibers or the fiber rods being impregnated with a matrix, with the result that the matrix is formed in and on the fiber rods. The matrix can also be formed in such a way that it extends between the fiber rods, with the result that the matrix fills the volume between the fiber rods. A connecting point or connecting portion is situated between a connecting rod and a support rod at the point at which the connecting rod bears against the support rod for connecting the connecting rod to the support rod.

A design variant in which at least three of the at least three fiber rods form a framework structure through their arrangement with respect to one another is advantageous.

Also advantageous is a design in which at least three fiber rods each form a support rod. The support rods are arranged substantially parallel to one another in their axial direction and are situated on at least two spaced-apart planes. The result is that they form an imaginary volume between them. At least one connecting rod is wound around the support rods forming the imaginary volume and connects the support rods to one another. The at least one connecting rod forms the node points with the support rods forming the volume at its connecting points with the support rods forming the imaginary volume.

In an advantageous development, the at least one connecting rod or the connecting rods forms or form, together with the support rods forming the imaginary volume, a three-dimensional framework through their arrangement with respect to one another.

The fiber rods are arranged in a lattice structure, wherein the lattice structure takes the form of a framework or three-dimensional framework, with the result that the fiber rods which form the framework are loaded exclusively with normal forces, that is to say with forces along the longitudinal axis of the fiber rods.

Of further advantage is a design form in which the fiber component is a support whose lateral surfaces consist at least in part of the at least three fiber rods which are arranged in the framework structure or in the plurality of framework structures.

In a design variant, it is also of advantage that the support is determined by the fiber rods or support rods forming the volume, and the lateral surfaces are each situated between two of the parallel fiber rods or support rods forming the volume.

Also advantageous is a development form in which a support rod is connected to the connecting rod at their common node point by press-molding the support rod with the connecting rod. Press-molding the fiber rods causes the impregnated fiber rods to be partially connected to one another via their external matrix and thus to be adhesively bonded to one another. The support rod and the connecting rod are connected in an integrally bonded manner.

In an advantageous development form, the fiber rods have, at least at the node points, a matrix consisting of a thermoplastic or a thermoset.

Also advantageous is a design variant in which a fiber rod is connected to the further fiber rod or a support rod is connected to the connecting rod at their common node point by the matrix. Here, the fiber rods are first impregnated in their intended, framework-like arrangement or arranged to form the framework shortly after the impregnation. The matrix of the fiber rods mixes and, upon curing of the matrix, forms an inseparable, integrally bonded connection between the fiber rods. Here, the matrix can also enclose the entire framework structure and fill cavities in the framework structure.

In an advantageous design variant, a fiber rod is connected to the further fiber rod or a support rod is connected to the connecting rod at their common node point by a plastic which at least partially surrounds the fiber rod and the further fiber rod or the support rod and the connecting rod. Here, the plastic forms at least the node point and thus connects the fiber rods to one another. Alternatively, the plastic can additionally enclose the entire framework structure which is formed by the fiber rods and fill cavities in the framework structure. The plastic envelops the fiber rods impregnated by the matrix.

Also provided according to the invention is a method for producing a fiber component in which the at least three fiber rods are placed in a tool in such a way that at least two fiber rods of the at least three fiber rods are arranged parallel to and at a distance from one another, and at least one fiber rod is wound around the at least two fiber rods and forms therewith at least one node point at their connecting points. The fiber rods are impregnated with the matrix and then the fiber component is separated from the tool after a curing time. The impregnation of the fiber rods can be carried out before or after placing the fiber rods in the tool. Prepregs (pre-impregnated fiber rods) can also be placed in the tool or used. After placing the fiber rods in the tool, the fiber component which is formed from the at least three fiber rods is released from the tool after a curing time.

It is advantageous that the tool has a nonpermanent mold or is a nonpermanent mold in which the at least three fiber rods are arranged upon placement in the tool. The nonpermanent mold preferably consists of wax and can be produced by a 3D printing method.

A combination of the step of arranging the fiber rods in the nonpermanent mold and the step of producing the nonpermanent mold makes it possible to realize complex structures. For example, a 3D printer can fabricate a part of the nonpermanent mold, in which a robot places a fiber rod or a plurality of fiber rods. After placement of the fiber rods, a further part of the nonpermanent mold can be produced by the 3D printer, wherein a placement of fiber rods follows again.

It is further advantageous that the nonpermanent mold is meltable and is melted upon release of the fiber rods from the tool. Melting the nonpermanent mold causes the melted nonpermanent mold to flow out of the framework formed from the at least three fiber rods.

It is advantageous that the at least three fiber rods are placed and arranged with respect to one another in the nonpermanent mold by a robot, with the result that the at least three fiber rods form the framework structure.

It is further advantageous that the tool alternatively has a blow-molding core, a silicone core or a rubber-elastic core. The blow-molding core, the silicone core or the rubber-elastic core can be removed from the fiber component and thus be reused. The blow-molding core, the silicone core or the rubber-elastic core is a permanent mold.

Alternatively, it is advantageous that the tool has a core which remains in the fiber component or can be removed from the fiber component.

In the case of a component comprising a plurality of fiber components, it is advantageous that the fiber components of the plurality of fiber components are each rectilinear, a fiber component of the plurality of fiber components is respectively connected on a side in the longitudinal direction to a side in the longitudinal direction of another fiber component of the plurality of fiber components at a connecting point, the fiber component is arranged at an angle with respect to the other fiber component, and a flexible element is fixed at a plurality of connecting points. The result is that the flexible element forms a radius, following the connecting points. The flexible element is, for example, a metal sheet and forms the outer surface or visible surface of a construction.

The above-disclosed features can be combined as desired provided that this is technically possible and they are not in conflict with one another.

Other objects, advantages and novel features of the present invention will become apparent from the following detailed description of one or more preferred embodiments when considered in conjunction with the accompanying drawings.

DETAILED DESCRIPTION OF THE DRAWINGS

The figures are schematic by way of example. The same reference signs in the figures indicate the same functional and/or structural features.

Figure 1:
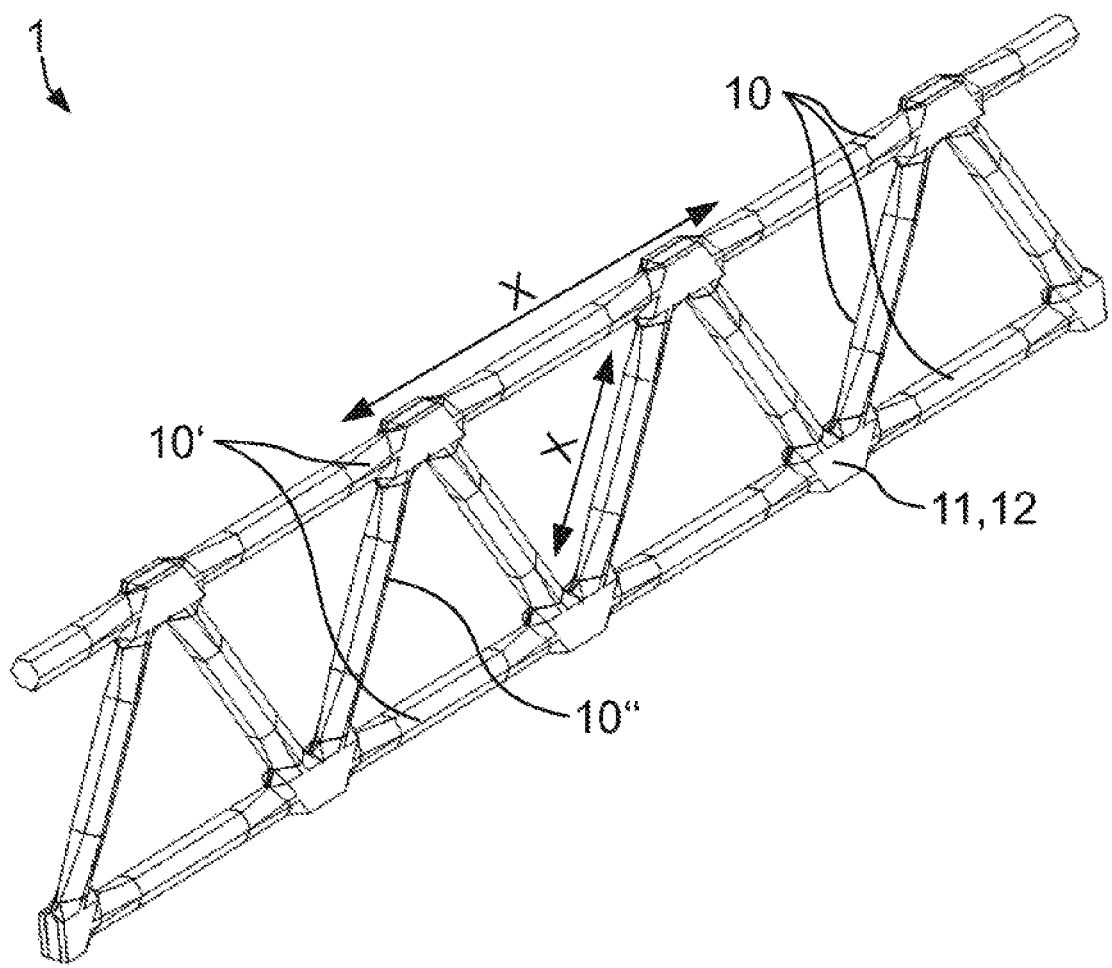
FIG. 1 shows a flat fiber component in an isometric illustration.

FIG. 1 shows a flat fiber component 1 which is formed from three fiber rods 10. Two of the three fiber rods 10 are arranged parallel to one another as support rods 10' and have a distance between them. The axial direction X of the two parallel support rods 10' does not change. The third fiber rod 10 is wound in a zigzag-shaped profile as connecting rod 10" around the two parallel support rods 10'. At the connecting points 12 of the connecting rod 10" with the two parallel support rods 10', the respective fiber rods 10 form node points 11. The connecting rod 10" changes the orientation of its axial direction X only at the node points 11 and extends between the node points 11 without changing the orientation of its axial direction X. The fiber component of FIG. 1 extends substantially in the plane, with the result that it is approximately two-dimensional.

Figure 2:
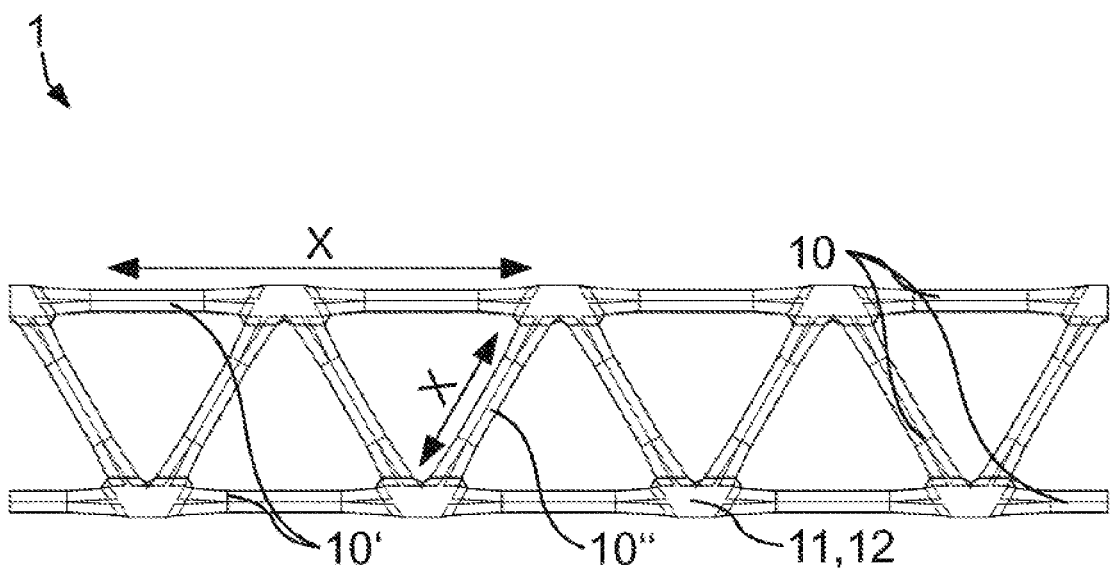
FIG. 2 shows a flat fiber component in a side view.

FIG. 2 shows the fiber component from FIG. 1 in a side view.

Figure 3:
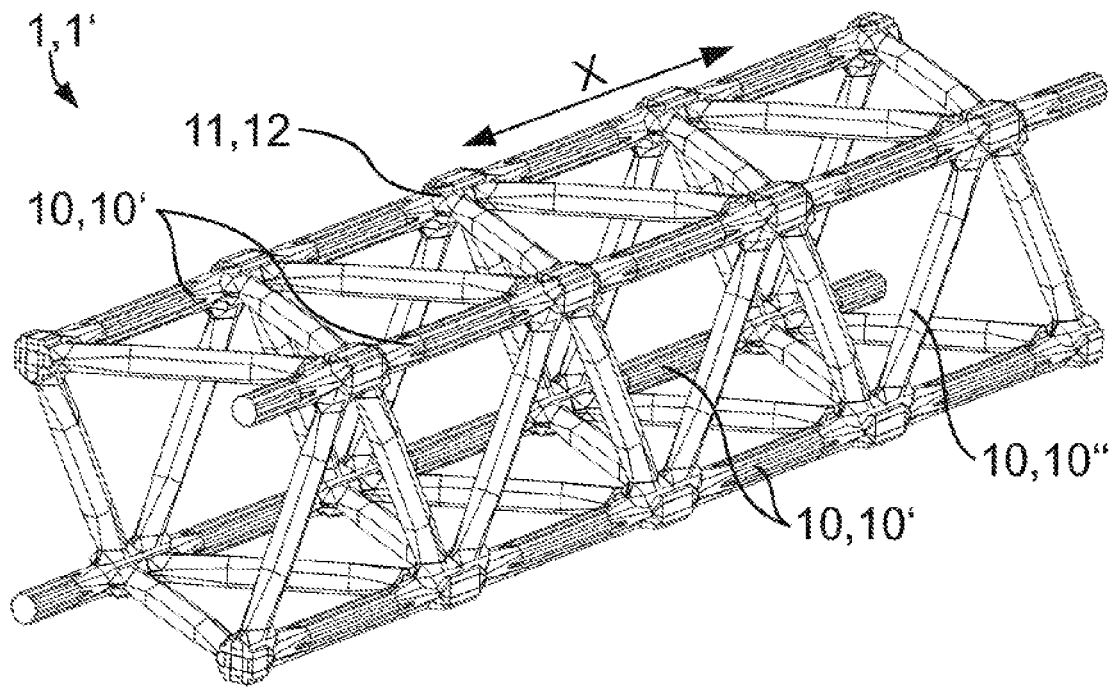
FIG. 3 shows a three-dimensional framework-forming fiber component in an isometric illustration.

FIG. 3 shows a further fiber component 1 which is formed, however, from four parallel support rods 10' and two connecting rods 10". In each case two of the parallel support rods 10' are situated in two spaced-apart planes, with the result that a parallelepipedal volume is spanned between the four support rods 10'. A connecting rod 10" is wound around the four support rods 10', with the result that the fiber component 1 is a support 1'. At the connecting points 12 of the connecting rod 10" with the support rods 10', the fiber rods 10 form node points 11, with the connecting rod 10" changing the orientation of its axial direction X at the node points 11. The fiber rods 10 and the node points 11 are embedded in a matrix which, after curing, stiffens the fiber rods 10 and the node points 11.

Figure 4:
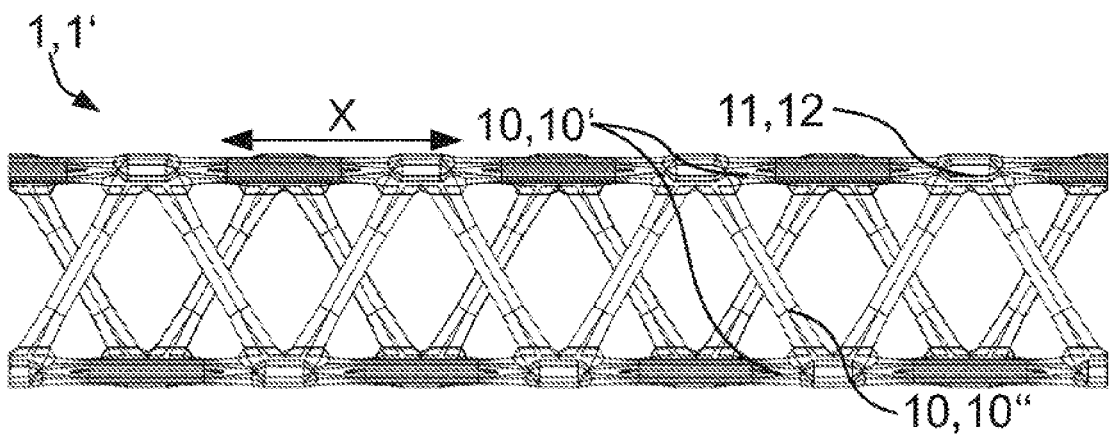
FIG. 4 shows a three-dimensional framework-forming fiber component in a side view.

FIG. 4 shows a side view of the fiber component from FIG. 3.

Figure 5:
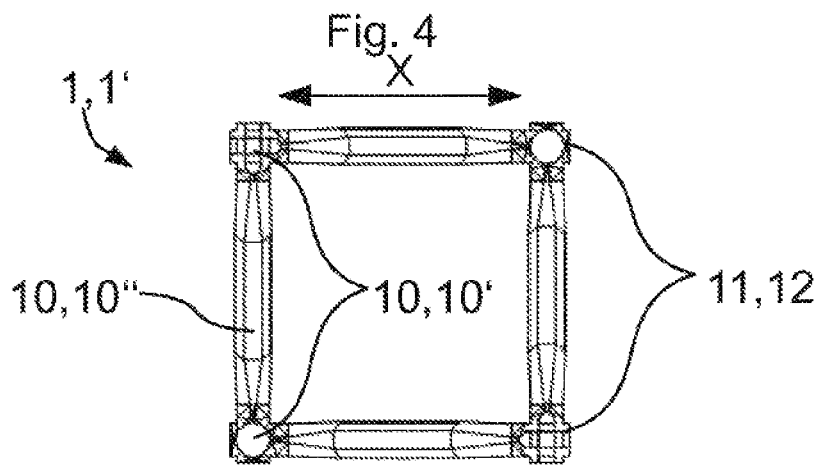
FIG. 5 shows a three-dimensional framework-forming fiber component in a front view.

FIG. 5 shows a front view of the fiber component from FIG. 3.

The invention in terms of its implementation is not limited to the above-stated preferred exemplary embodiments. Rather, a number of variants are conceivable which make use of the presented solution even for fundamentally different embodiments. For example, it is possible with the framework structure to form fiber components in geometries other than a support or a rod, for example parallelepipeds, spheres or complex irregular geometries. Fiber composite components produced in such a way can be used, for example, as bicycle frames or for other sports equipment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of producing a framework structure, comprising:
    producing a nonpermanent mold of wax by a 3D printing method;
    placing at least three fiber rods, each having fibers extending continuously in an axial direction of the fiber rods, in the nonpermanent mold of wax such that:
        the at least three fiber rods form a framework structure as arranged with respect to one another,
        at least two of the three fiber rods, each forming a support rod, are arranged parallel to one another and spaced apart from one another, and
        at least one of the three fiber rods, forming a connecting rod, is wound around the two support rods in a zigzag-shaped profile and forms node points therewith, wherein the connecting rod changes an orientation of its axial direction only at the node points and extends between the node points without changing the orientation of its axial direction; and
    impregnating the at least three fiber rods with a matrix in the nonpermanent mold of wax;
    connecting the two support rods with the connecting rod at the node points by the matrix in the nonpermanent mold of wax;
    enclosing an entirety of the framework structure by the matrix and filling cavities in the framework structure by the matrix in the nonpermanent mold of wax; and
    after a curing time, melting the nonpermanent mold of wax such that the melted nonpermanent mold flows out of the framework structure formed by the at least three fiber rods.

2. The method according to claim 1, wherein
    the at least three fiber rods are placed in the nonpermanent mold of wax and arranged with respect to one another by a robot.

* * * * *